US012631477B2

(12) United States Patent
Raci et al.

(10) Patent No.: US 12,631,477 B2
(45) Date of Patent: May 19, 2026

(54) METHOD, CALIBRATION DEVICE AND FUSION UNIT FOR CALIBRATING A SENSOR

(71) Applicant: Robert Bosch GmbH, Stuttgart (DE)

(72) Inventors: Edonis Raci, Neckarsulm (DE); Frank Schoenmann, Nuremberg (DE); Sebastian Nusser, Hildesheim (DE); Tobias Frye, Braunschweig (DE); Yann-Ael Muller, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 689 days.

(21) Appl. No.: 18/160,074

(22) Filed: Jan. 26, 2023

(65) Prior Publication Data

US 2023/0258482 A1      Aug. 17, 2023

(30) Foreign Application Priority Data

Feb. 16, 2022    (DE) ..................... 10 2022 201 593.2

(51) Int. Cl.
*G01D 18/00* (2006.01)
*G01S 7/40* (2006.01)
(Continued)

(52) U.S. Cl.
CPC .................................... *G01D 18/00* (2013.01)

(58) Field of Classification Search
CPC ....... G01D 18/00; G01S 7/497; G01S 7/4082; G01S 7/52004; G01S 15/08; G01S 15/86;
(Continued)

(56) References Cited

U.S. PATENT DOCUMENTS 9,279,882 B2 * 3/2016 Hukkeri .................... G01S 7/40
2018/0196127 A1 7/2018 Harada
(Continued)

FOREIGN PATENT DOCUMENTS

DE      102017205720 A1    10/2018
DE      102019216071 A1     4/2020
(Continued)

*Primary Examiner* — Laura Martin
*Assistant Examiner* — Anthony W Megna Fuentes
(74) *Attorney, Agent, or Firm* — NORTON ROSE FULBRIGHT US LLP

(57) ABSTRACT

A method, a calibration device and a fusion unit for calibrating a sensor. The method includes: ascertaining a first piece of information representing a distance and/or a position of a first calibration device with respect to a second calibration device, ascertaining a piece of calibration information representing a distance and/or a position of the first calibration device with respect to the sensor based on the first piece of information and a second piece of information, which represents an absolute position of the second calibration device and/or a distance and/or a position of the second calibration device with respect to the sensor, transmitting the calibration information to the sensor, and calibrating the sensor based on the calibration information and a determination of the distance and/or position of the first calibration device and the second calibration device with respect to the sensor by way of a measurement by the sensor.

11 Claims, 3 Drawing Sheets

(51) Int. Cl.

| | |
|---|---|
| *G01S 7/497* | (2006.01) |
| *G01S 7/52* | (2006.01) |
| *G01S 15/08* | (2006.01) |
| *G01S 15/86* | (2020.01) |
| *G01S 15/88* | (2006.01) |
| *G01S 19/23* | (2010.01) |
| *G06T 7/80* | (2017.01) |

(58) Field of Classification Search
CPC .......... G01S 15/88; G01S 7/40; G01S 19/235;
G06T 7/80
See application file for complete search history.

(56) References Cited

U.S. PATENT DOCUMENTS

| | | | |
|---|---|---|---|
| 2020/0363500 A1* | 11/2020 | Lau ........................... | G01S 7/40 |
| 2021/0316743 A1* | 10/2021 | Chang .................. | G01S 13/865 |
| 2021/0374432 A1 | 12/2021 | Kaku et al. | |
| 2022/0284627 A1* | 9/2022 | Johnson .............. | H04N 17/002 |

FOREIGN PATENT DOCUMENTS

| | | |
|---|---|---|
| DE | 102019220049 A1 | 6/2021 |
| WO | 2021188664 A1 | 9/2021 |

\* cited by examiner

METHOD, CALIBRATION DEVICE AND FUSION UNIT FOR CALIBRATING A SENSOR

CROSS REFERENCE

The present application claims the benefit under 35 U.S.C. § 119 of German Patent Application No. DE 10 2022 201 593.2 filed on Feb. 16, 2022, which is expressly incorporated herein by reference in its entirety.

FIELD

The present invention relates to a method, a calibration device and a fusion unit for calibrating a sensor.

BACKGROUND INFORMATION

Sensors, particularly stationary sensors, that are used to detect traffic infrastructure components such as roads, intersections, etc., in order, for example, to increase road safety in areas with poor visibility, etc., are available in the related art. Particularly advantageously, traffic information detected by such sensors may be transmitted to autonomous and/or partially autonomous vehicles for use by these vehicles for autonomous journey planning.

The use of calibration devices (also known as calibration targets) as references for sensor calibration is described in the related art, different properties of calibration devices, such as different colors and patterns for cameras, triple mirrors for radar systems and the like, being used for different sensor types.

To calibrate sensors using calibration devices as described above, it is usually necessary to manually measure positions and/or orientations of individual calibration devices in the environment of sensors requiring calibration. The measurement results generated by this process may then be compared with positions and/or orientations of the calibration devices detected by the sensors themselves, in order to locate the sensors in space. Moreover, any discrepancies between individual measurements may be compensated by an overlapping placement of calibration devices.

SUMMARY

According to a first aspect of the present invention, a method is provided for calibrating a sensor, the sensor preferably being a fixedly installed sensor for monitoring a traffic infrastructure component, without restricting the sensor to such a form and/or use. Likewise, a measurement technology used by the sensor to detect an environment of the sensor is not in principle restricted to one or more specific measurement technologies.

In a first step of the method according to an example embodiment of the present invention, a second calibration device ascertains a first piece of information representing a distance and/or a position of a first calibration device with respect to the second calibration device, the first calibration device and the second calibration device each being situated in a detection range of the sensor.

The detection of the first calibration device by the second calibration device advantageously takes place using a measuring instrument of the second calibration device, comprising, for example, a lidar sensor and/or a radar sensor and/or an ultrasonic sensor and/or a camera and/or a different sensor system for determining distance and/or position.

It is noted that the term "position" used here and below represents at least part of a piece of spatial position information or preferably a complete piece of spatial position information, with respect to a predefined reference system, concerning the detected calibration device. This advantageously also includes at least one and preferably all rotations of the calibration device in relation to the predefined reference system.

It is further noted that individual or all pieces of distance and/or position information that are ascertained and/or processed during the performance of the method according to the present invention may each take the form of and/or be processed as relative and/or absolute values.

It is also noted that the first calibration device and the second calibration device are preferably both mobile calibration devices, which are used particularly for an initial calibration of the sensor following a placement and/or mounting of the sensor at its target position. This does not explicitly exclude the possibility that at least one of the calibration devices used remains permanently situated in the environment of the sensor, in order for the plausibility of an initially performed calibration of the sensor to be checked on a recurrent basis, for example.

The first calibration device and the second calibration device each have predefined detection features for detection by the sensor. These detection features, which are each adapted to one or more measurement technologies used by the sensor, take the form of, for example, optical measurement boards (e.g., with a predefined pattern and/or a predefined color scheme) and/or radar reflectors and/or ultrasonic reflectors and/or lidar reflectors, etc.

In a second step of the method according to an example embodiment of the present invention, a piece of calibration information representing a distance and/or a position of the first calibration device with respect to the sensor is ascertained on the basis of the first piece of information and on the basis of a second piece of information, the second piece of information representing an absolute position of the second calibration device and/or a distance and/or a position of the second calibration device with respect to the sensor.

In a third step of the method according to an example embodiment of the present invention, the calibration information is transmitted to the sensor.

In a fourth step of the method according to an example embodiment of the present invention, the sensor is calibrated by way of a measurement by the sensor, based on the calibration information and based on a determination of the distance and/or position of the first calibration device and the second calibration device with respect to the sensor. The measurement carried out by the sensor enables the sensor to compare the distance and/or position information relating to the calibration devices that was transmitted to the sensor from outside the sensor with the distance and/or position information relating to the calibration devices that was ascertained by the sensor itself. If discrepancies are found between the values measured by the sensor itself and the values provided from outside (i.e., the expected values), these discrepancies may be compensated in the sensor accordingly. Following the compensation, the calibration of the sensor is completed. The compensation may be achieved by, for example, adjusting a signal processing operation in the sensor and/or by a manual and/or automatic realignment of the sensor and/or of components of the sensor.

The method according to the present invention as described above offers the advantage that, inter alia, a manual measurement of calibration devices in the environment of a sensor requiring calibration, as is necessary in the related art in the course of calibrating this sensor, may be dispensed with, as a consequence of which any inaccuracies and/or errors occurring in a manual measurement of this kind may be avoided.

This allows, firstly, for a reliable calibration based on the automatically ascertained distances and/or positions of the calibration devices used, and, secondly, it also enables, in particular, the time needed to ascertain the respective distances and/or positions to be reduced significantly in comparison to a manual measurement. It may be assumed that such a time reduction leads to a cost saving; in particular, it offers the further advantage that traffic disruptions that may be necessary in order to measure the calibration devices and subsequently to calibrate the sensor, owing to road closures to allow for the temporary placement of calibration devices, etc., may be significantly shortened on the basis of the method according to the present invention.

Preferred developments and example embodiments of the present invention are disclosed herein.

In an advantageous example embodiment of the present invention, the second piece of information is ascertained by the second calibration device on the basis of a determination of the distance and/or position of the sensor with respect to the second calibration device. Advantageously, the sensor is designed in such a way that the same measuring instrument that is used in the second calibration device to detect the first calibration device may also be used for ascertaining the distance and/or position of the sensor with respect to the second calibration device. Alternatively, it is also possible for the second calibration device to have and to use different measuring instruments to detect further calibration devices and/or to detect the sensor. Alternatively or in addition, it is possible for the second piece of information to be ascertained on the basis of a satellite-based position determining sensor (e.g., a GNSS sensor, etc.) and/or a compass and/or a position sensor of the second calibration device. As a further alternative or in addition, it is possible for the second piece of information to be ascertained on the basis of a distance and/or position determination by at least one further calibration device differing from the second calibration device. To this end, the further calibration device ascertains, for example, distance and/or position information relating to the second calibration information and the sensor, respectively, with respect to the further calibration device, in order to ascertain the second piece of information on the basis of said information.

It is possible for the first calibration device to be designed as a passive calibration device with no sensors of its own. In other words, in such a case the first calibration device is not able to detect or measure other calibration devices in the environment of the first calibration device. However, a use of passive calibration devices in connection with the method according to the present invention offers the advantage that not all calibration devices used to calibrate the sensor have to be equipped with their own measuring instrument, so an inclusion of passive calibration devices results in a cost benefit. The advantages according to the present invention of a faster and more reliable measurement of the calibration devices used are retained in this case, provided that it is ensured that all passive calibration devices are able to be detected and hence located by other calibration devices having an integrated measuring instrument. Alternatively, the first calibration device has a sensor system (measuring instrument) for detecting a distance and/or a position of further calibration devices with respect to the first calibration device and/or for detecting its own position (e.g., a GNSS sensor, etc.). To this end, the first calibration device is identical in design to the second calibration device, for example, without being limited thereto. Calibration devices having their own sensors/measuring instruments for detecting distances and/or positions of further calibration devices and/or sensors are also referred to below as active calibration devices.

Particularly advantageously, according to an example embodiment of the present invention, at least one third piece of information representing a distance and/or a position of a third calibration device with respect to the second calibration device is ascertained by the second calibration device, the third piece of information feeding into the calibration information and being taken into consideration when calibrating the sensor.

Furthermore, it is advantageously possible to use fourth, fifth, sixth or further active or passive calibration devices, each of which is detectable by the second calibration device and/or by calibration devices other than the second calibration device.

In a further advantageous example embodiment of the present invention, the sensor is a first sensor, while a second sensor is calibrated by the second calibration device and/or by a calibration device other than the second calibration device, the second sensor having a disjoint or overlapping detection range with respect to the detection range of the first sensor. Particularly advantageously, the method according to the present invention may be used in connection with a first sensor and a second sensor having essentially the same detection range, such that on the basis of a resulting double detection of an environment by two sensors, a particularly reliable recognition of objects in this environment is possible. A use of the method according to the present invention to calibrate the first sensor and the second sensor thus allows for a particularly precise coordination of the sensors with one another. Further advantageously, it is possible for the first sensor and the second sensor each to use different measurement technologies (with one sensor in the form of a radar sensor and the other sensor in the form of a camera, for example), and this may further increase reliability in detecting identical or similar detection ranges. In addition to a use of almost completely overlapping detection ranges, detection ranges having a partial overlap (e.g., less than 70%, less than 50% or less than 30%, etc.) are also possible. Properties of the first sensor and of the second sensor mentioned above may also apply by analogy to further sensors (e.g., third, fourth, etc.) to be calibrated. Alternatively or in addition, it is possible for the second sensor to be calibrated on the basis of the same or on the basis of a different combination of calibration devices in comparison to the first sensor. A use of a different combination is useful if, for example, the sensors have only partially overlapping detection ranges and thus possibly only a subset of calibration devices may be able to be used together for a calibration in accordance with the present invention.

As mentioned above, it is possible for the first sensor and the second sensor to use identical or differing measurement technologies, especially in order to make an environment detection based on differing measurement technologies particularly reliable, since if a situation makes it non-optimal to detect an object in the environment using one of the measurement technologies, it may be more reliably detectable by the other measurement technology used by the other sensor. Alternatively or in addition, it is advantageously possible for one or more of the calibration devices each to have both predefined first detection features for detection by the first sensor and predefined second detection features for detection by the second sensor. The first detection features and the second detection features may, for example, be identical detection features that differ in terms of their respective arrangement positions on the calibration devices and/or in terms of their respective orientations with respect to the first sensor and the second sensor, in order to be optimally detectable in each case by the different sensors. Alternatively or in addition, it is possible, for example, for the first detection feature to be designed for a measurement technology of the first sensor (e.g., as a radar reflector), while the second detection feature is designed for a measurement technology of the second sensor (e.g., as a lidar reflector), for example. Moreover, it is also possible for one or more of the sensors that are used to have first and/or second detection features so as to be optimally detectable by respective calibration devices and by the measurement technologies they use.

According to an example embodiment of the present invention, the calibration information is preferably ascertained by a fusion unit that is part of at least one calibration device and/or of at least one sensor and/or of a stand-alone fusion component. The stand-alone fusion component is designed as a remote (e.g., cloud-based) processing unit, for example, to which the first and second pieces of information are transmitted by the calibration device or devices, and which uses this information to calculate the necessary calibration information, which it then makes available to the sensor or sensors. Alternatively or in addition, the fusion component fuses distance and/or position information relating to all calibration devices used in the method, in order to generate a complete overview of arrangement positions of the calibration devices that are used, and advantageously of the orientations thereof, for the sensor calibration process, the fusion preferably taking place in consideration of a predefined error model.

In a further advantageous embodiment of the present invention, the sensor is a sensor for monitoring a traffic infrastructure component (e.g., a traffic intersection, a freeway onramp or offramp, a parking facility, an accident black spot, etc.). Alternatively or in addition, the sensor is designed as a lidar sensor and/or as a camera and/or as an ultrasonic sensor and/or as a radar sensor and/or as another kind of sensor. As a further alternative or in addition, the first information and/or the second information and/or the calibration information is transmitted in a wireless and/or wired manner. To this end, the active calibration devices that are used have a wireless communication unit, for example, which provides any suitable wireless transmission standard in order to allow for data communication with one or more sensors and/or with one or more further calibration devices. The wireless communication unit uses, for example, vehicle-to-x (V2X) communication and/or cellular communication (e.g., 4G/5G) and/or Bluetooth communication, without being limited to these examples. Depending on the system design, communication with a separate fusion component should also be provided, unless the fusion of the distance and/or position information relating to the individual calibration devices is carried out in one of the calibration devices and/or in one of the sensors itself. As already mentioned, it is also possible for all or some of the necessary data communications to be carried out in a wired manner, by connecting the relevant components of the system via a data cable.

According to a second aspect of the present invention, a calibration device for calibrating a sensor is provided. According to an example embodiment of the present invention, the calibration device comprises: at least one predefined detection feature (e.g., a radar reflector and/or a lidar reflector and/or an ultrasonic reflector and/or an optical measurement board, etc.), a measuring instrument (e.g., a radar sensor system and/or a lidar sensor system and/or an ultrasonic sensor system and/or a camera, etc.), and an evaluation unit, in the form of, for example, an ASIC, FPGA, processor, digital signal processor, microcontroller, or similar. The predefined detection feature is designed to be detected by the sensor, and the evaluation unit is equipped to ascertain, by way of the measuring instrument, a piece of information representing a distance and/or a position of at least one further calibration device with respect to the calibration device and to provide the ascertained information (e.g., via a wireless and/or a wired data communication interface).

Advantageously, the information ascertained by way of the calibration device is a first piece of information, and the evaluation unit is preferably further equipped to ascertain a second piece of information, which represents an absolute position of the calibration device and/or a distance and/or a position of the calibration device with respect to the sensor. Moreover, the evaluation unit is equipped to provide the second piece of information (likewise via a wireless and/or a wired data communication interface, for example).

According to a third aspect of the present invention, a fusion unit for calibrating a sensor is provided. According to an example embodiment of the present invention, the fusion unit is equipped to ascertain a piece of calibration information representing a distance and/or a position of a first calibration device with respect to the sensor on the basis of a first piece of information and a second piece of information, and to transmit the calibration information to the sensor, the first piece of information representing a distance and/or a position of the first calibration device with respect to a second calibration device and the second piece of information representing an absolute position of the second calibration device and/or a distance and/or a position of the second calibration device with respect to the sensor. The fusion unit is designed as, for example, a stand-alone component having a suitable wireless and/or wired data communication interface. Alternatively or in addition, the fusion unit is designed as part of at least one calibration device that is used and/or of at least one sensor that is used.

BRIEF DESCRIPTION OF THE DRAWINGS

Exemplary embodiments of the present invention are described in detail below by reference to the figures.

DETAILED DESCRIPTION OF EXAMPLE EMBODIMENTS

Figure 1:
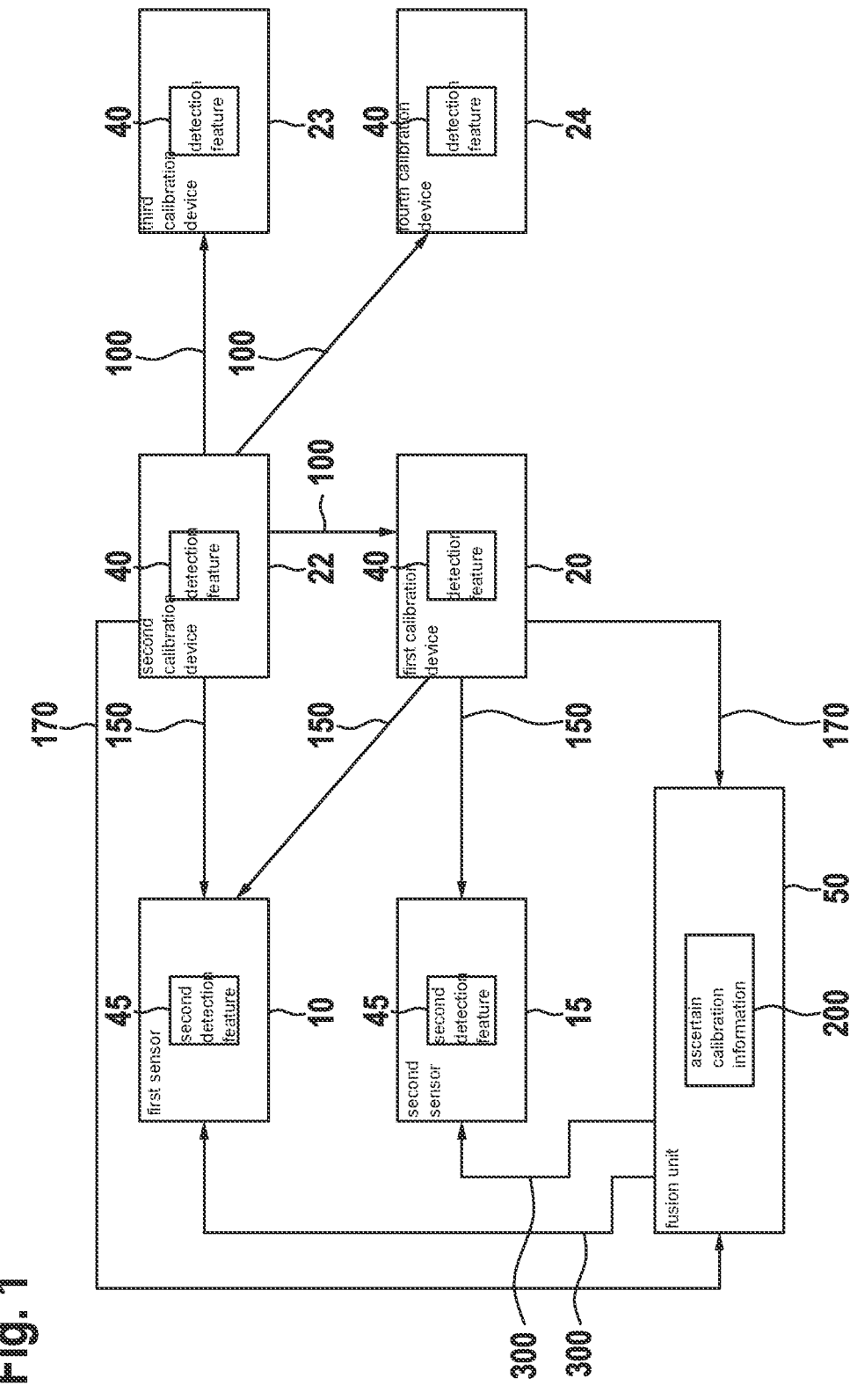
FIG. 1 shows a block diagram to illustrate a specific embodiment of a method according to the present invention.

FIG. 1 shows a block diagram to illustrate a specific embodiment of a method according to the present invention.

In a method step 100, by way of a second calibration device 22 in the form of an active calibration device, which in this specific embodiment includes a first measuring instrument 52 (see FIG. 3), a first position determining sensor 30 (see FIG. 3), a first wireless communication unit 60 (see FIG. 3), a detection feature 40 and a first evaluation unit 55 (see FIG. 3), a first piece of information, representing a distance and a position of a first calibration device 20 with respect to second calibration device 22, is ascertained on the basis of evaluation unit 55, which in this case is designed as a microcontroller.

First detection feature 40 is designed as a radar reflector, for example, and is situated on an outer side of a housing of second calibration device 22. Advantageously, second calibration device 22 has a plurality of such detection features 40 situated on the outer side of the housing in various positions, such that detection features 40 are detectable from different directions relative to second calibration device 22.

First calibration device 20 is identical in design to second calibration device 22, such that second calibration device 22 is able to detect and measure first calibration device 20 by way of a radar measurement, since a radar signal sent out by second calibration device 22 by way of first measuring instrument 52 is reflected by detection feature 40 of first calibration device 20 and thus partially bounced back to second calibration device 22.

First evaluation unit 55 of second calibration device 22 is equipped to receive radar signals received from the environment by way of first measuring instrument 52 and on the basis thereof to ascertain a distance and a position of first calibration device 20 with respect to second calibration device 22.

First calibration device 20, second calibration device 22, a third calibration device 23 and a fourth calibration device 24 are each located in a detection range of a first sensor 10 and a second sensor 15, which in this case are each designed as radar sensors. First sensor 10 and second sensor 15 each have at least one second detection feature 45, which is likewise designed as a radar reflector.

Third calibration device 23 and fourth calibration device 24 are in this case designed as passive calibration devices with no sensors of their own, but they each likewise have at least one detection feature 40 in the form of a radar reflector.

On this basis, in method step 100, second calibration device 22 is additionally able to ascertain a distance and a position of third calibration device 23 and of fourth calibration device 24 with respect to second calibration device 22.

Moreover, first evaluation unit 55 of second calibration device 22 is equipped to ascertain an absolute position of second calibration device 22 by way of first position determining sensor 30, which in this case is designed as a GNSS sensor, for example.

In a step 150, first calibration device 20 and second calibration device 22 each ascertain a distance and a position of the first sensor with respect to calibration devices 20, 22, respectively. Also in step 150, first calibration device 20 additionally ascertains a distance and a position of second sensor 15 with respect to first calibration device 20. The ascertained distances and positions of sensors 10, 15 relative to respective calibration devices 20, 22 constitute second pieces of information.

In a step 170, the first pieces of information and the second pieces of information are transmitted by first wireless communication units 60 of calibration devices 20, 22, respectively, to a fusion unit 50, a WLAN standard, for example, being used here for the transmission.

In a step 200, a piece of calibration information representing a distance and/or a position of calibration devices 20, 22, 23, 24 with respect to sensors 10, 15, respectively, is ascertained by fusion unit 50 on the basis of the first pieces of information and the second pieces of information.

In a step 300, the calibration information is sent by fusion unit 50 to a second wireless communication unit 74 (not shown) of first sensor 10 and to a second wireless communication unit (not shown) of second sensor 15.

In a step 400, second evaluation units of sensors 10, 15, respectively, use the calibration information received to compare results of environment measurements by first sensor 10 and by second sensor 15, in the course of which comparison, measurements of distances to calibration devices 20, 22, 23, 24 in the environment of sensors 10, 15 are performed by respective second measuring instruments 70 (not shown). If discrepancies are identified between the position information relating to calibration devices 20, 22, 23, 24 contained in the calibration information and the distance measurements carried out by sensors 10, 15, compensation data are ascertained on the basis of these discrepancies and then used to calibrate sensors 10, 15.

Figure 2:
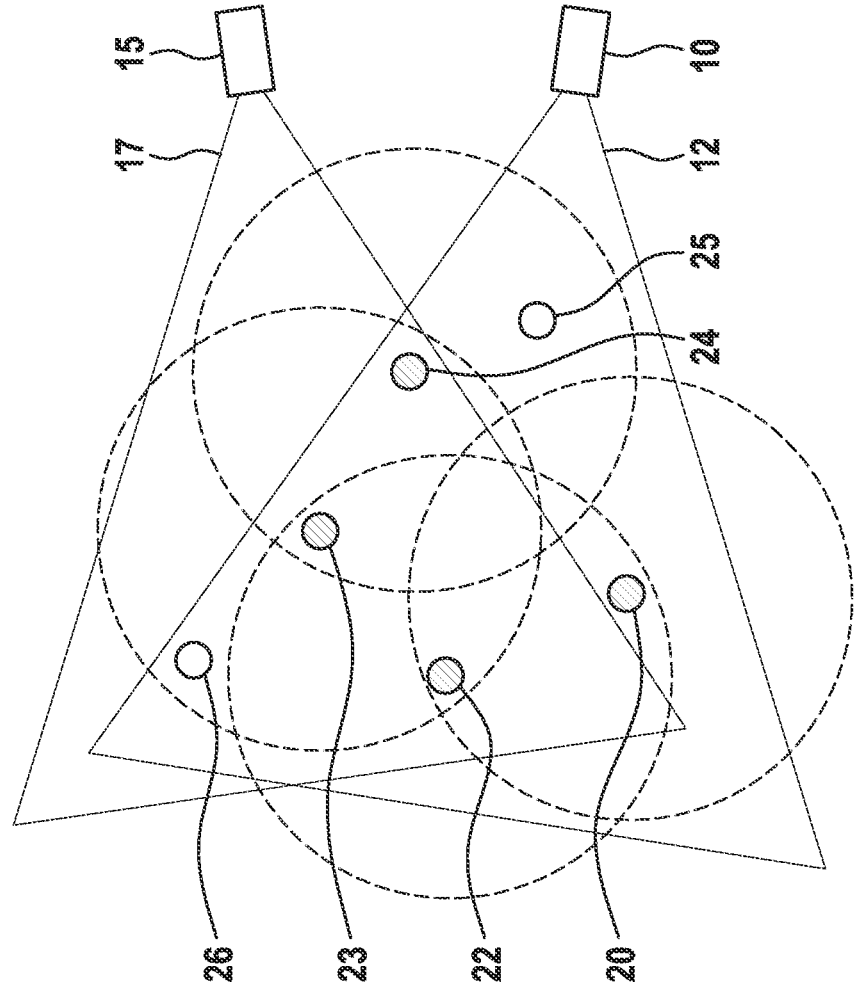
FIG. 2 shows an example of an arrangement of sensors according to the present invention and calibration devices for calibrating the sensors.

FIG. 2 shows an exemplary arrangement of sensors 10, 15 according to the present invention, with respective detection ranges 12, 17, and a plurality of calibration devices 20, 22, 23, 24, 25, 26 for calibrating sensors 10, 15.

First sensor 10 is designed in this case as a lidar sensor, while second sensor 15 is designed in this case as a camera.

First calibration device 20, second calibration device 22, third calibration device 23 and fourth calibration device 24 are each designed in this case as active calibration devices with their own measuring instruments, while fifth calibration device 25 and sixth calibration device 26 are each designed as passive calibration devices without their own measuring instruments.

Respective detection ranges of active calibration devices 20, 22, 23, 24 are represented by dashed circles within which calibration devices 20, 22, 23, 24 may each detect and measure further calibration devices 20, 22, 23, 24, 25, 26 and sensors 10, 15 in the environment.

Figure 3:
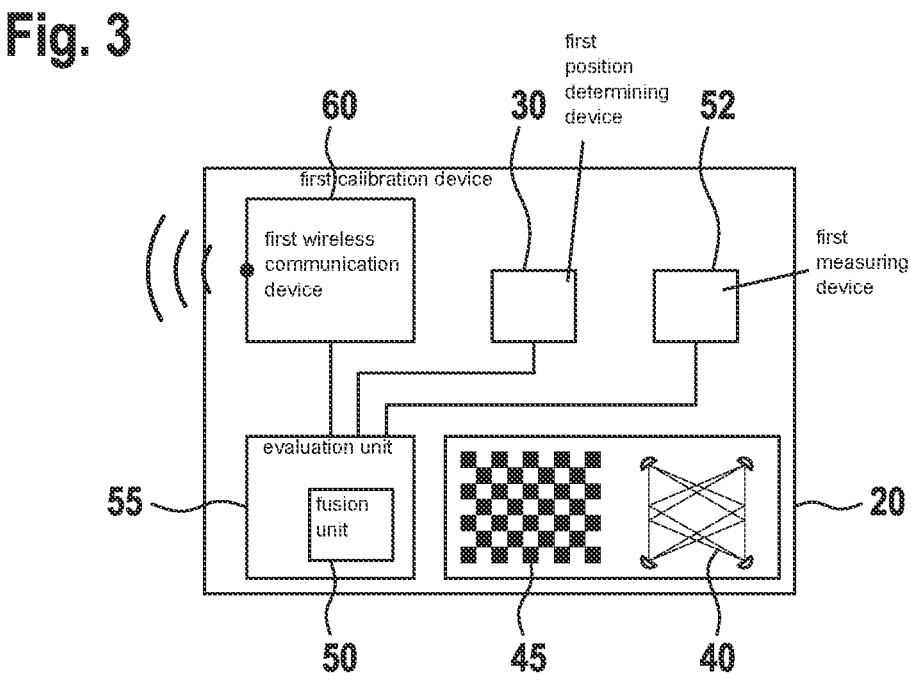
FIG. 3 shows an example of a specific embodiment of a calibration device according to the present invention.

FIG. 3 shows an example of a specific embodiment of a calibration device 20 according to the present invention, which includes a position determining sensor 30, which is designed as a GNSS sensor, a measuring instrument 52, which is based on an ultrasonic sensor system, a second detection feature 45 designed as a pattern board for a calibration of a camera, a first detection feature 40 designed as a radar reflector, a wireless communication unit 60 based on a cellular standard, and an evaluation unit 55 designed as an ASIC, evaluation unit 55 including a fusion unit 50 according to the present invention.

Figure 4:
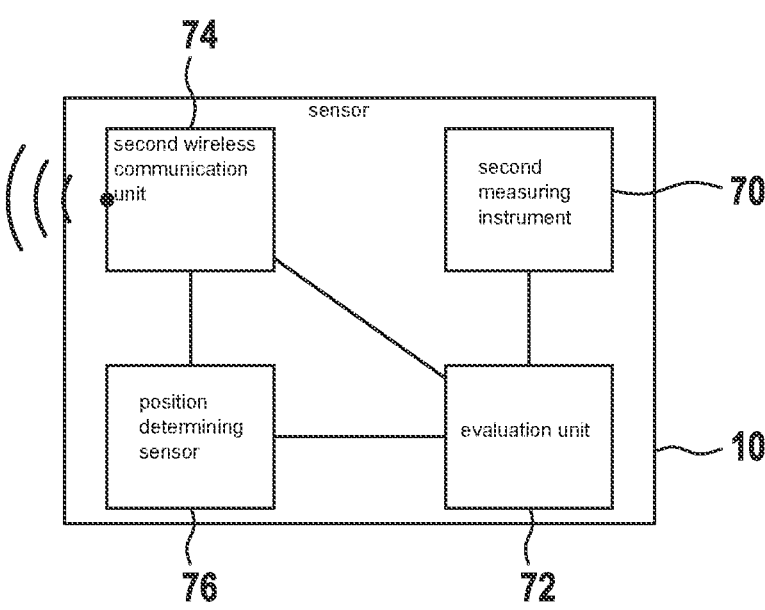
FIG. 4 shows an example of a specific embodiment of a sensor according to the present invention.

FIG. 4 shows an example of a specific embodiment of a sensor 10 according to the present invention, which comprises a measuring instrument 70 based on an optical camera, an evaluation unit 72 designed as an ASIC, a position determining sensor 76 designed as a GNSS sensor, and a wireless communication unit 74 based on a cellular standard.

What is claimed is:

1. A method for calibrating a sensor, comprising:
   ascertaining a first piece of information representing a distance and/or a position of a first calibration device with respect to a second calibration device by way of the second calibration device, the first calibration device and the second calibration device each being situated in a detection range of the sensor, and each having predefined detection features for detection by the sensor;
   ascertaining a piece of calibration information representing a distance and/or a position of the first calibration device with respect to the sensor based on (a) the first piece of information and (b) a second piece of information, wherein the second piece of information represents: an absolute position of the second calibration device and/or a distance of the second calibration device with respect to the sensor and/or a position of the second calibration device with respect to the sensor; transmitting the calibration information to the sensor; and calibrating the sensor based on the calibration information, and based on a determination of the distance and/or position of the first calibration device and the second calibration device with respect to the sensor by way of a measurement by the sensor.

2. The method as recited in claim 1, wherein the second piece of information is ascertained based on:

a determination of the distance and/or position of the sensor with respect to the second calibration device by the second calibration device, and/or a satellite-based position determining sensor, and/or a compass and/or a position sensor of the second calibration device, and/or a distance and/or position determination by at least one further calibration device differing from the second calibration device.

3. The method as recited in claim 1, wherein the first calibration device:

(i) is a passive calibration device without its own sensors, or (ii) has sensors for detecting:

a distance and/or a position of further calibration devices with respect to the first calibration device, and/or its own position.

4. The method as recited in claim 1, wherein:

at least one third piece of information representing a distance and/or a position of a third calibration device with respect to the second calibration device is ascertained by the second calibration device, and the third piece of information feeds into the calibration information and is taken into consideration when calibrating the sensor.

5. The method as recited in claim 1, wherein:

the sensor is a first sensor, and/or a second sensor is calibrated by the second calibration device and/or by a calibration device differing from the second calibration device, and/or the second sensor has a disjoint or overlapping detection range with respect to a detection range of the first sensor, and/or the second sensor is calibrated based on the same or based on a different combination of calibration devices in comparison to the first sensor.

6. The method as recited in claim 5, wherein:

the first sensor and the second sensor use identical or differing measurement technologies, and/or one or more of the calibration devices have both predefined first detection features for detection by the first sensor and predefined second detection features for detection by the second sensor.

7. The method as recited in claim 1, wherein the calibration information is ascertained by a fusion unit, which:

is part of at least one calibration device and/or of at least one sensor and/or of a stand-alone fusion component, and/or fuses distance and/or position information relating to all calibration devices used in the method, to generate a complete overview of arrangement positions of the calibration devices that are used for the sensor calibration process, the fusion taking place in particular in consideration of a predefined error model.

8. The method as recited in claim 1, wherein:

the sensor:

is a sensor for monitoring a traffic infrastructure component, and/or is a lidar sensor and/or a camera and/or a ultrasonic sensor and/or a radar sensor, and/or the first information and/or the second information and/or the calibration information is transmitted in a wireless and/or wired manner.

9. A first calibration device for calibrating a sensor, the first calibration device comprising:

at least one respective predefined detection feature that is detectable by the sensor;

a measuring instrument; and an evaluation unit;

wherein:

the evaluation unit is configured to:

ascertain, by way of the measuring instrument of the first calibration device, a first piece of information representing a distance and/or a position of the first calibration device with respect to a second calibration device, the first calibration device and the second calibration device each being situated in a detection range of the sensor, and the second calibration device also having a respective at least one predefined detection feature that is detectable by the sensor;

ascertain a second piece of information representing:

(i) an absolute position of the first calibration device, and/or (ii) a distance of the first calibration device with respect to the sensor, and/or (iii) a position of the first calibration device with respect to the sensor; and ascertain calibration information representing a distance and/or a position of the second calibration device with respect to the sensor based on the first piece of information and the second piece of information; and the first calibration device is configured to transmit the calibration information to the sensor to calibrate the sensor based on the calibration information and based on a determination, by way of a measurement by the sensor, of distances and/or positions of the first calibration device and the second calibration device with respect to the sensor.

10. A fusion unit for calibrating a sensor, the fusion unit being configured to:

ascertain a piece of calibration information representing a distance and/or a position of a first calibration device with respect to the sensor based on a first piece of information and a second piece of information; and transmit the calibration information to the sensor;

wherein:

the first piece of information represents a distance and/or a position of the first calibration device with respect to a second calibration device, the second piece of information represents an absolute position of the second calibration device and/or a distance and/or a position of the second calibration device with respect to the sensor.

11. A calibration system for calibrating a sensor, comprising:

a fusion unit comprising a processor; and a first calibration device and a second calibration device that are each situated in a detection range of the sensor and that each comprises:

at least one predefined detection feature configured to be detected by the sensor;

a measuring instrument; and an evaluation unit;

wherein:

the evaluation unit of the first calibration device is configured to ascertain:

a first piece of information representing a distance and/or a position of the first calibration device with respect to a second calibration device; and a second piece of information representing:

(i) an absolute position of the first calibration device, and/or (ii) a distance of the first calibration device with respect to the sensor, and/or (iii) a position of the first calibration device with respect to the sensor;

the processor of the fusion unit is configured to ascertain calibration information representing a distance and/or a position of the second calibration device with respect to the sensor based on the first piece of information and the second piece of information;

the fusion unit is configured to transmit the calibration information to the sensor; and the sensor is configured to calibrate itself based on the calibration information and based on a determination, by way of a measurement by the sensor, of distances and/or positions of the first calibration device and the second calibration device with respect to the sensor.

* * * * *